US009363618B2

(12) United States Patent
Ma

(10) Patent No.: US 9,363,618 B2
(45) Date of Patent: Jun. 7, 2016

(54) METHOD AND DEVICE FOR CONTROLLING SPEAKER ARRAY SOUND FIELD BASED ON QUADRATIC RESIDUE SEQUENCE COMBINATIONS

(71) Applicant: Suzhou Sonavox Electronics Co., Ltd, Suzhou, Jiangsu (CN)

(72) Inventor: Dengyong Ma, Jiangsu (CN)

(73) Assignee: Suzhou Sonavox Electronics Co., Ltd., Suzhou (CN)

( * ) Notice: Subject to any disclaimer, the term of this patent is extended or adjusted under 35 U.S.C. 154(b) by 457 days.

(21) Appl. No.: 13/901,903

(22) Filed: May 24, 2013

(65) Prior Publication Data

US 2013/0322635 A1 Dec. 5, 2013

(30) Foreign Application Priority Data

May 29, 2012 (CN) .......................... 2012 1 0169953

(51) Int. Cl.

| | |
|---|---|
| ***H04R 5/00*** | (2006.01) |
| ***H04R 1/02*** | (2006.01) |
| ***G06F 17/00*** | (2006.01) |
| ***H04S 3/00*** | (2006.01) |
| ***H04R 1/40*** | (2006.01) |

(52) U.S. Cl.
CPC . *H04S 3/00* (2013.01); *H04R 1/403* (2013.01)

(58) Field of Classification Search
CPC ....... H04S 3/00; H04S 1/002; H04S 2420/13; H04R 1/403; H04R 3/12
USPC ........... 381/59, 77, 80, 81, 82, 85, 89, 97, 98, 381/101, 102, 111, 116, 117, 150, 300, 381/332; 700/94
See application file for complete search history.

(56) References Cited

U.S. PATENT DOCUMENTS 7,978,860 B2 * 7/2011 Miura ....................... H04R 5/04 381/1
2006/0050897 A1 * 3/2006 Asada ....................... H04R 3/12 381/98

(Continued)

FOREIGN PATENT DOCUMENTS

CN 100521817 C 2/2005
CN 1929696 * 3/2007 ............... H04R 3/00

(Continued)

OTHER PUBLICATIONS

Klepper David L., Steele Douglas W., "Constant Direction Characteristics from a Line Source Array," J.A.E.S, vol. 11, No. 3, pp. 198-202, Jul. 1963.

(Continued)

*Primary Examiner* — Vivian Chin
*Assistant Examiner* — William A Jarez Lora
(74) *Attorney, Agent, or Firm* — Connie Ding; Peter L. Brewer; Baker Donelson IP

(57) ABSTRACT

The present invention discloses a method and device for controlling speaker array sound field based on a quadratic residue sequence combination. The method comprises steps of: (1) fragmenting a designated quadratic residue sequence in terms of the number of array elements, to generate a plurality of quadratic residue subsequences; (2) designing an optimal array phase delay vector utilizing these subsequences; (3) controlling transmission signals of multi-element channels according to the optimal phase delay vector to adjust phase delay; (4) sending the multi-channel signals subjected to adjustment to a multi-channel power amplifier, to drive the speaker array to generate uniform sound field. The device comprises a sound source, an optimal phase delay estimator, an optimal phase delay controller, a multi-channel power amplifier and a speaker array. The invention can expand the coverage range of sound field radiated from an array and improve uniformity of the sound field. Furthermore, according to the invention, the hardware implementation of the control method of sound field is simple, and the spatial distribution characteristics of sound field meet the requirements of array sound reinforcement system.

13 Claims, 7 Drawing Sheets

(56) References Cited

U.S. PATENT DOCUMENTS

| | | | | |
|---|---|---|---|---|
| 2006/0165242 | A1 * | 7/2006 | Miki | H04R 3/005 381/59 |
| 2008/0212791 | A1 * | 9/2008 | Asada | G10K 11/1788 381/71.6 |

FOREIGN PATENT DOCUMENTS

| | | | |
|---|---|---|---|
| CN | 1929696 | A | 3/2007 |
| CN | 101426156 | A | 5/2009 |

OTHER PUBLICATIONS van der Wal Menno, Start Evert W., de Vries Diemer, "Design of Logarithmically Spaced Constant-Directivity Transducer Arrays," J. Audio Eng. Soc., vol. 44, pp. 497-507, Jun. 1996.

Keele Jr. D. B., "Effective Performance of Bessel Arrays," J.A.E.S., vol. 38, No. 10, pp. 723-748, Oct. 1990.

Jiang Chao, Shen Yong, "An Omni-directivity Sound Source Array," Mo. P2. 11, The 18th International Congress on Acoustics, Kyoto, Japan, Apr. 2004.

* cited by examiner

METHOD AND DEVICE FOR CONTROLLING SPEAKER ARRAY SOUND FIELD BASED ON QUADRATIC RESIDUE SEQUENCE COMBINATIONS

RELATED APPLICATIONS

This application claims the benefit of People's Republic of China application Serial No. 201210169953.1 filed on May 29, 2012, under 35 USC Sec. 119(a) hereby specifically incorporated by reference in its entirety.

FIELD OF THE INVENTION

The present invention relates a method and device for controlling speaker array sound field, particularly to a method and device for controlling speaker array sound field based on quadratic residue sequence combinations.

DESCRIPTION OF THE RELATED ART

In some audio-visual place of large space such as a large hall, a stadium, an open-air square, a railway station and an airport, the conventional sound reproducing system based on separately arranged multiple speakers will cause that many peak-valley points arise spatially in the superposed sound field of the multiple speakers, due to severe interference effect existing in the sound field radiated from the multiple speakers. Particularly with the increase of the frequency of the radiation signals, the non-uniform characteristics of the spatial distribution of the superposed sound field will become more severe. To solve the non-uniform coverage problem of sound field in large space, design of array systems based on multiple speaker units gradually become a research focus on sound reinforcement system in large space.

In recent years, many researchers and audio engineers devote themselves to design and research of speaker array systems, by adjusting the physical parameters such as array shape, channel delay, channel amplitude and phase, they desire to improve the distribution characteristics of the spatial sound field radiated from the array, that is to say, to expand the coverage range of the sound field radiated from the array and enhance the uniformity degree of the sound field distribution of the array. Furthermore, to improve the sound field distribution characteristics of the speaker array within the range of broadband and large space, many design methods and implementation devices are recorded in existing documents, some of which are listed hereinafter by way of example:

Document 1 [Klepper David L., Steele Douglas W., "Constant Direction Characteristics from a Line Source Array," J.A.E.S, Vol. 11, No. 3, pp. 198-202, July 1963.] provides to filter out the high frequency components of some speaker units to improve characteristics of the whole sound filed spatially radiated from the speaker arrays by utilizing electricity or acoustics filters.

Document 2 [van der Wal Menno, Start Evert W., de Vries Diemer, "Design of Logarithmically Spaced Constant-Directivity Transducer Arrays," J. Audio Eng. Soc., Vol. 44, pp. 497-507, June 1996.] provides to enhance the uniformity degree of sound field spatially radiated from the array by arranging the speaker array in accordance with a logarithmic interval.

Document 3 [Keele Jr. D. B., "Effective Performance of Bessel Arrays," J.A.E.S., Vol. 38, No. 10, pp. 723-748, October 1990.] provides to set the sound pressure radiation intensity for each speaker unit of the array according to the numerical value of Bessel Function, thereby improving the uniformity of sound field radiated from the array.

Document 4 [Jiang Chao, Shen Yong, "An Omni-directivity Sound Source Array," Mo. P2. 11, The 18th International Congress On Acoustics, Kyoto, Japan, April 2004.] provides to regulate the sound pressure radiation intensity for each speaker unit of the array according to the characteristics of Sinc Function, thereby improving the phase characteristics of sound field while enhancing the uniformity degree thereof.

Document 5 [Patent Application No. 200410044849.5, Publication No. CN 100521817C, Titled: A method and device for setting a speaker array by utilizing quadratic residue sequences, Shen yong, Jiang chao, Xu xiaobing, Zhang suzhen] provides to optimize the sound field spatially radiated from the speaker array by utilizing the characteristics of quadratic residue sequences, and to adjust signal delay of array element channel of each speaker in terms of the ratio relation of the quadratic residue sequences, to improve the uniformity of sound field.

Document 6 [Patent application No. 200610096523.6, Publication No. CN 1929696 B, Titled: a method and device for setting speaker array by utilizing phase delay of quadratic residue sequence, Shen Yong, An kang, Ou dayi] provides to adjust the phase of array element of each speaker in terms of ratio relation of quadratic residue sequences, to improve uniformity of sound field.

Although these methods based on changing array shape or adjusting amplitude of array element channel described in documents 1-4 can improve the uniformity of sound field, but physical implementation of these methods is complicated and the radiation efficiency of sound reproducing system is low, thus having poor practicability. The method for controlling channel delay based on quadratic residue sequences mentioned in document 5 can improve the sound field within broadband range of the array in some extent, but obvious change is observable in spatial direction pattern of the array with the variation of frequency, and severe non-uniformity arises at some frequency points for the radiated sound field. As compared with the method described in document 5, the method for controlling channel phase delay based on quadratic residue sequences disclosed in document 6 has more advantages, such as, variation of the spatial sound field arisen from the variation of array with frequency is reduced, and the sound field uniformity for the array is further improved in the range of broadband and large space.

The method for adjusting channel phase delay based on quadratic residue sequences disclosed in document 6, which is simple in physical implementation, can greatly improve uniformity of sound field. However, such array phase delay vector designed utilizing only one certain quadratic residue sequence which is equivalent to the array element in amount is not an optimal array phase delay vector, though it improve sound field in some extent. Therefore, the method provided in document 6 does not consider to optimize the sound field effect of array phase delay vector by expanding the coverage range of the quadratic residue sequence, and does not attempt to enhance the ability of quadratic sequence to improve the uniformity of array sound field by utilizing combinations of different quadratic residue sequences, thereby the beneficial effect of quadratic residue sequences on the array sound field being not exerted sufficiently. Consequently, the uniformity characteristics of array sound field can still be further improved by utilizing the combination characteristics of quadratic residue sequences.

Considering the problems of existing methods for controlling phase delay based on single certain quadratic residue sequence such as limited properties, insufficient optimization in the improvements of sound field radiated from the speaker array, it is necessary to optimize and design array phase delay vector by means of the combination of different quadratic residue sequences by expanding the coverage range of quadratic residue sequences, to improve the uniformity of sound field radiated from the array in the range of broadband and large space.

SUMMARY OF THE INVENTION

An object of the invention is to provide a method as well as a device for controlling speaker array sound field based on quadratic residue sequence combinations, to address the existed problems, such as limited properties, insufficient optimization, of existing methods based on single certain quadratic residue sequence on improving array sound field.

For this purpose, the present invention provides a method for controlling speaker array sound field based on quadratic residue sequence combinations, comprising the steps of:

(1) fragmenting a designated quadratic residue sequence in terms of number of array elements, to generate a plurality of quadratic residue subsequences;

(2) designing an optimal array phase delay vector by using the subsequences;

(3) controlling transmission signals of multi-array-element channels by means of the optimal phase delay vector, to adjust phase delay; and (4) transmitting the multi-channel signals subjected to delay adjustment to multi-channel power amplifiers, to drive a speaker array to generate uniform sound field.

Preferably, the designated quadratic residue sequence in step (1) is produced from the following formula:

$$c_N = n^2 \bmod N$$

wherein $c_N$ is the No. n element of the designated quadratic residue sequence, N is the length of the sequence, and mod represents modulo.

Preferably, the sequence length N of the designated quadratic residue sequence in step (1) is greater than element number L, and the minimum sequence length $N_{min}$ is greater than 10×L.

Preferably, the step (1) is achieved by following process: provided that the designated quadratic residue sequence is expressed as:

$$c_N = [c_1 c_2 \ldots c_N]^T$$

fragmenting the quadratic residue sequence $C_N$ in terms of the element number L to generate M subsequences, wherein N is greater than M×L, and upon fragmenting the sequence $C_N$ being expressed by the quadratic residue sequences as:

$$c_N = [c_L^{(1)^T} c_L^{(2)^T} \ldots c_L^{(M)^T}]^T,$$

wherein $c_L^{(i)}$ is the No. i quadratic residue subsequence produced after sequence fragmentation, and $c_L^{(i)}$ being expressed as:

$$c_L^{(i)} = [c_{(i-1)L+1}^{(i)} c_{(i-1)L+2}^{(2)} \ldots c_{(i-1)L+L}^{(i)}]^T.$$

More preferably, the step (2) is achieved by following process:

constructing a phase delay control vector $\phi_L^{(i)}$ for an array with L array elements from No. i quadratic residue subsequence $c_L^{(i)}$ with a length of L, and $\phi_L^{(i)}$ being expressed as:

$$\begin{aligned}\varphi_L^{(i)} &= [\phi_1^{(i)}\ \phi_2^{(i)}\ \ldots\ \phi_L^{(i)}]^T \\ &= c_L^{(i)} \times \phi_0\end{aligned}$$

wherein $\phi_l^{(i)}$ is the phase delay vector corresponding to the No. l array element, and $\phi_l^{(i)}$ being expressed as:

$$\phi_l^{(i)} = c_{(i-1)L+1}^{(i)} \times \phi_0$$

wherein $\phi_0$ is a phase delay constant, and $\phi_0$ being expressed as:

$$\phi_0 = 2\pi/N$$

combining the array phase delay vectors constructed from a plurality of quadratic residue subsequences, provided that a combination sequence of the quadratic residue sequences combined from $c_L^{(1)}, c_L^{(2)}, \ldots, c_L^{(K)}$ in terms of sequence number i of quadratic residue subsequences is $d_L^{\{1,2,\ldots,K\}}$, then expression formula thereof is:

$$d_L^{\{1,2,\ldots,K\}} = [c_L^{(1)} c_L^{(2)} \ldots c_L^{(K)}]$$

wherein 1≤K≤M, and the array phase delay vector constructed from the combination sequence $d_L^{\{1,2,\ldots,K\}}$ of the quadratic residue subsequences is $\phi_L^{\{1,2,\ldots,K\}}$, being expressed as:

$$\begin{aligned}\varphi_L^{\{1,2,\ldots,K\}} &= \underbrace{\varphi_L^{(1)} \times \varphi_L^{(2)} \times \ldots \times \varphi_L^{(K)}}_{multiplication\ of\ k\ vectors} \\ &= \underbrace{c_L^{(1)} \times \phi_0 \times c_L^{(2)} \times \phi_0 \times \ldots \times c_L^{(K)} \times \phi_0}_{multiplication\ of\ k\ vectors} \\ &= \underbrace{c_L^{(1)} \times c_L^{(2)} \times \ldots \times c_L^{(K)}}_{multiplication\ of\ k\ vectors} \times (\phi_0)^K \\ &= \underbrace{c_L^{(1)} \times c_L^{(2)} \times \ldots \times c_L^{(K)}}_{multiplication\ of\ k\ vectors} \times \phi_o^K\end{aligned}$$

$$\text{wherein } \phi_0^K = \frac{2\pi K}{N};$$

provided that in free space, the sound field radiated from a L-element speaker array is sampled discretely at S points in a semi-circular space with a radius of r, in the case where the center position of the speaker array is defined as coordinate origin O, the included angle between the line connecting No. s observation point with the coordinate origin O and the array normal line is defined as Qs, then the coordinate Qs of the No. s observation point is expressed as:

$$q_s = (x_s, y_s)$$

and the position coordinate of the No. l array element being expressed as:

$$u_l = (x_l, y_l)$$

provided that the distance between the No. l array element and the No. s observation point is $r_l^{(s)}$, then expression formula thereof is:

$$\begin{aligned}r_l^{(s)} &= \|q_s - u_l\| \\ &= \sqrt{(x_s - x_l)^2 + (y_s - y_l)^2}\end{aligned}$$

in the case where the frequency of sound source signals is f, the sound pressure radiated from the No. l array element at the No. s observation point $Q_s$ may be expressed as:

$$p_{l,f}^{(s)} = A\frac{\exp j(2\pi f t - k r_l^{(s)})}{k r_l^{(s)}}$$

wherein A is the amplitude of the sound source signals, k=2πf/c represents wave number, and c represents the spread velocity of sound wave, if the effect of the amplitude A and phase $\exp(j2\pi ft)$ of the sound source signals is neglected, then the sound pressure radiated from the No. l array element at the No. s observation point $Q_s$ may be expressed simply as:

$$\tilde{p}_{l,f}^{(s)} = \frac{\exp(-jkr_l^{(s)})}{kr_l^{(s)}},$$

and the sound pressure radiated from the whole speaker array at the No. s observation point $Q_s$ being expressed as:

$$\tilde{p}_f^{(s)} = \sum_{l=1}^{L} \tilde{p}_{l,f}^{(s)} = \sum_{l=1}^{L} \frac{\exp(-jkr_l^{(s)})}{kr_l^{(s)}};$$

introducing the array phase delay vector $\phi_L^{\{1,2,\ldots,K\}}$ constructed from the combination sequence $d_L^{\{1,2,\ldots,K\}}$ of the quadratic residue sequence into the speaker array, and controlling phase delay of each array element according to the vector $\phi_L^{\{1,2,\ldots,K\}}$, and then the sound pressure radiated from the whole array after phase delay at the No. s observation point $Q_s$ being expressed as:

$$\tilde{p}_{f,K}^{(s)} = \sum_{l=1}^{L} \tilde{p}_{l,f}^{(s)} = \sum_{l=1}^{L} \frac{\exp(-jkr_l^{(s)})}{kr_l^{(s)}} \times \exp(j\varphi_L^{\{1,2,\ldots,K\}});$$

arranging the sound pressure radiated from the speaker array at all observation points after phase delay adjustment as a column vector, which is expressed as:

$$\tilde{p}_{f,K}=[\tilde{p}_{f,K}^{(1)}\tilde{p}_{f,K}^{(2)} \ldots \tilde{p}_{f,K}^{(s)}]^T$$

the sound pressure amplitude vectors corresponding to all observation points being expressed as:

$$\hat{p}_{f,K}=[|\tilde{p}_{f,K}^{(1)}||\tilde{p}_{f,K}^{(2)}| \ldots |\tilde{p}_{f,K}^{(s)}|]^T$$

and the variance estimators of the sound pressure amplitude vectors at all observation points for the speaker array being expressed as:

$$\mathrm{var}(\hat{p}_{f,k}) = \frac{\sum_{s=1}^{S}\left[\hat{p}_{f,K} - \overline{\hat{p}_{f,K}}\right]^2}{S}$$

wherein $$\overline{\hat{p}_{f,K}} = \frac{\sum_{s=1}^{S}\hat{p}_{f,K}}{S}$$

represents average value of the sound pressure amplitude vectors;

when phase delay vectors $\phi_L^{\{1\}}$, $\phi_L^{\{1,2\}}$, . . . , $\phi_L^{\{1,2,\ldots,K\}}$, . . . , $\phi_L^{\{1,2,\ldots,M\}}$ generated from combination sequences $d_L^{\{1\}}$, $d_L^{\{1,2\}}$, . . . , $d_L^{\{1,2,\ldots,K\}}$, . . . , $d_L^{\{1,2,\ldots,M\}}$ of the quadratic residue sequence are applied to the array respectively, in the case where each delay vector control is performed, the variance estimator sequences of sound pressure amplitude vectors at all observation points are calculated as $\mathrm{var}(\hat{p}_{f,1})$, $\mathrm{var}(\hat{p}_{f,2})$, . . . , $\mathrm{var}(\hat{p}_{f,K})$, . . . , $\mathrm{var}(\hat{p}_{f,M})$, and the above variance estimators being arranged as a column vector, which is expressed as:

$$\mathrm{var}(\hat{p}_f)=[\mathrm{var}(\hat{p}_{f,1})\mathrm{var}(\hat{p}_{f,2}) \ldots \mathrm{var}(\hat{p}_{f,M})]^T;$$

by analyzing and comparing the numerical values of various elements of variance estimator vectors, selecting the phase delay vector corresponding to the minimum variance estimator as an optimal phase delay vector, and adjusting phase delay for the array utilizing the optimal phase delay vector to obtain optimal array radiation sound field, provided that the index number of the minimum variance estimator in variance estimator vectors for the sound pressure amplitude vectors is $K_{opt}$, then the corresponding minimum variance estimator is expressed as:

$$\mathrm{var}(\hat{p}_{f,K_{opt}}) = \min(\mathrm{var}(\hat{p}_f)) = \frac{\sum_{s=1}^{S}\left[\hat{p}_{f,K_{opt}} - \overline{\hat{p}_{f,K_{opt}}}\right]^2}{S}$$

the optimal phase delay vector applied to the array corresponding to the minimum variance estimator being:

$$\varphi_L^{\{1,2,\ldots,K_{opt}\}} = \underbrace{\varphi_L^{(1)} \times \varphi_L^{(2)} \times \ldots \times \varphi_L^{(K_{opt})}}_{\text{multiplication of k vectors}} = \underbrace{c_L^{(1)} \times c_L^{(2)} \times \ldots \times c_L^{(K_{opt})}}_{\text{multiplication of k vectors}} \times \phi_0^{K_{opt}}$$

$$\text{wherein } \phi_0^{K_{opt}} = \frac{2\pi K_{opt}}{N};$$

when the optimal phase delay vector for the speaker array is designed in the case where sound source signals are input in broadband, the whole broadband is discretized in terms of a designated frequency interval to select the sequence index numbers corresponding to the optimal array phase delay vectors at each discrete frequency point, and the sequence index numbers of these optimal vectors being arrayed as one index number vector, then the index number vector being averaged to obtain a average sequence index number, then the optimal phase delay vector corresponding to the average sequence index number being used as the optimal phase delay vector for the array in the case of broadband radiation, provided that the working frequency band of the speaker array is discretized to W frequency points, then the discretization frequency vector consisting of such discrete frequency point sequence is expressed as:

$$f=[f_1 f_2 \ldots f_W]^T,$$

at the No. w frequency sample point, when phase delay vectors $\phi_L^{\{1\}}$, $\phi_L^{\{1,2\}}$, . . . , $\phi_L^{\{1,2,\ldots,K\}}$, . . . , $\phi_L^{\{1,2,\ldots,M\}}$ generated from combination sequences $d_L^{\{1\}}$, $d_L^{\{1,2\}}$, . . . , $d_L^{\{1,2,\ldots,K\}}$, . . . , $d_L^{\{1,2,\ldots,M\}}$ of the quadratic residue sequence are applied to the array respectively, in the case where each delay vector control is performed, the variance estimator sequences of sound pressure amplitude vectors at all observation points are calculated respectively as $\mathrm{var}(\hat{p}_{f_w,1})$, $\mathrm{var}(\hat{p}_{f_w,2})$, . . . , $\mathrm{var}(\hat{p}_{f_w,K})$, . . . , $\mathrm{var}(\hat{p}_{f_w,M})$, then the above variance estimators being arranged as one column vector, which is expressed as:

$$\mathrm{var}(\hat{p}_{f_w})=[\mathrm{var}(\hat{p}_{f_w,1})\mathrm{var}(\hat{p}_{f_w,2})\ldots\mathrm{var}(\hat{p}_{f_w,M})]^T;$$

by analyzing and comparing the numerical value of each element of variance estimator vector, selecting the index number of the minimum variance estimator in the variance estimator vectors as $K_{opt}^{(f_w)}$ corresponding minimum variance estimator thereof being $$\mathrm{var}(\hat{p}_{f_w,K_{opt}^{(f_w)}}),$$

and the optimal phase delay vector applied to the array corresponding to such a minimum variance estimator being:

$$\varphi_{L,f_w}^{\{1,2,\ldots,K_{opt}^{(f_w)}\}}=\underbrace{\varphi_L^{(1)}\times\varphi_L^{(2)}\times\ldots\times\varphi_L^{(K_{opt}^{(f_w)})}}_{multiplication\ of\ k\ vectors}=\underbrace{c_L^{(1)}\times c_L^{(2)}\times\ldots\times c_L^{(K_{opt})}}_{multiplication\ of\ k\ vectors}\times\phi_0^{K_{opt}^{(f_w)}}$$

$$\text{wherein } \phi_0^{K_{opt}^{(f_w)}}=\frac{2\pi K_{opt}^{(f_w)}}{N},$$

according to such an analysis process, selecting the optimal phase delay vectors at each discrete frequency point and the corresponding sequence index numbers orderly, and the sequence index numbers of the optimal phase delay vectors obtained from all frequency points being arranged as one column vector, which is expressed as:

$$K_{opt}^{(f)}=[K_{opt}^{(f1)}K_{opt}^{(f2)}\ldots K_{opt}^{(f_w)}]^T,$$

wherein the average value of such index number vector is expressed as:

$$\overline{K_{opt}^{(f)}}=\left[\frac{K_{opt}^{(F)}}{W}\right],$$

wherein the operator[X] represents the largest integer part less than or equal to X, according to the average value of such index number, the corresponding optimal phase delay vector applied to the broadband array being selected as:

$$\varphi_{L,f}^{\{1,2,\ldots,\overline{K_{opt}^{(f)}}\}}=\underbrace{\varphi_L^{(1)}\times\varphi_L^{(2)}\times\ldots\times\varphi_L^{(\overline{K_{opt}^{(f)}})}}_{multiplication\ of\ k\ vectors}=\underbrace{c_L^{(1)}\times c_L^{(2)}\times\ldots\times c_L^{(\overline{K_{opt}^{(f)}})}}_{multiplication\ of\ k\ vectors}\times\phi_0^{\overline{K_{opt}^{(f)}}}$$

$$\text{wherein } \phi_0^{\overline{K_{opt}^{(f)}}}=\frac{2\pi\overline{K_{opt}^{(f)}}}{N},$$

by using the optimal phase delay vector $$\varphi_{L,f}^{\{1,2,\ldots,\overline{K_{opt}^{(f)}}\}}$$

for the speaker array, the optimal sound field radiation characteristics of the array within the whole designated broadband range being obtained.

Still more preferably, in the step (3), the phase delay adjustment for the multi-array-element channels is achieved by utilizing digital phase delay method, according to the numerical value of the optimal phase delay vector within digital signal processors such as DSP or FPGA.

Another object of the invention is to provide a device for controlling speaker array sound field based on quadratic residue sequence combinations, which comprises:

a sound source;

an optimal phase delay estimator, which is used for calculating the optimal phase delay vector for the array achieving the uniform sound field control within the range of large space and broadband;

an optimal phase delay controller electrically coupled to the output ends of the said sound source and the optimal phase delay estimator respectively, which is used for uploading the optimal phase delay vector calculated by the optimal phase delay estimator onto each array element channel and for adjusting the phase retardation of each array element channel according to the optimal phase delay vector;

a multi-channel power amplifier electrically coupled to the output end of the said optimal phase delay controller which is used for amplifying power of multi-channel signals after phase delay adjustment to drive the speaker array;

a speaker array electrically coupled to the output end of multi-channel power amplifier, which is used for converting the electrical power signals after phase delay adjustment into air vibration signals to improve the uniformity of sound field radiated from the array;

wherein the said sound source is the information to be replayed by the system.

Preferably, the sound source is selected from analog sound source signals generated from various analog devices, digital coding signals generated from various digital devices, or specified sound source signals which are received and demodulated by wireless receivers from broadcast signals' sent from wireless transmitter, or any combination thereof.

More preferably, the signal processing of the optimal phase delay estimator utilizing the method of array modeling and minimum search is performed as follows:

(A) at first, inputting the length of a designated quadratic residue sequence to generate a quadratic residue sequence in terms of the sequence length, and fragmenting the designated quadratic residue sequence according to the sequence length equal to array element in amount to generate quadratic residue subsequences, and then combing the quadratic residue subsequences to generate a plurality of combined sequences, and generating corresponding multiple phase delay vectors from the plurality of combined sequences respectively; subsequently, inputting the known parameters for sound field modeling, such as array element number, array element space, speaker caliber, discrete frequency point vector, array element location, observation point location, and establishing a calculation model for the spatial sound field radiated from the speaker array by utilizing these parameters;

(B) controlling the array delay at each frequency point orderly by utilizing multiple phase delay vectors respectively, to calculate out the sound pressure amplitude vectors of the array within the observation area for each delay vector control, and then calculating out the variance estimator sequences of the sound pressure amplitude vectors of the array at each frequency point orderly within the observation area in the case of multi-vector control; and (C) searching the minimum variance estimator sequence at each frequency point and recording the sequence index number corresponding to the minimum variance estimator sequence, and then averaging and rounding to various index numbers obtained by searching at all frequency points to obtain the average value of the index numbers, and subsequently calculating out the optimal phase delay vector for controlling uniformity of broadband sound field by utilizing the average value of index numbers.

More preferably, the optimal phase delay estimator determines the location of index numbers according to the experiential area coverage of the minimum variance sequences.

Still more preferably, the optimal phase delay controller achieves the phase delay operation of multi-channel broadband signals of the array by designing appropriate filter coefficient, according to the linear phase characteristics of finite impulse response filters.

Preferably, the multi-channel power amplifier is a multi-channel power amplifier of AB type or D type.

In the invention the speaker array is not limited to a linear speaker array, and which may be designed as any speaker arrays of various shapes according to the practical application demand.

By utilizing the foregoing technical solutions, the invention has following advantages over the prior art:

(1) As compared with conventional methods for designing a phase delay vector based on single quadratic residue sequence, the method for designing an optimal phase delay vector for a speaker array based on quadratic residue sequence combinations according to the invention has excellent effect on improving uniformity of sound field within the whole range of wideband frequency. By controlling the phase delay vectors according to the invention, the resulting sound field has wider coverage range, smaller fluctuation, as well as improved uniformity.

(2) The invention is only directed to adjusting the phase delay of multiple channels for a speaker array, wherein the signal amplitude characteristics of the multiple channels are not changed, and the phase delay vectors can be obtained prior by means of simulation modeling of array sound field, and then the delay control is performed to each channel of the array according to the phase delay vectors obtained from simulation experiment. Thus, the method and device of the invention is simple in physical implementation and more real-time, and complicated circuit and array shape, as well as large numbers of measurement experiments are not needed according to the present invention.

(3). The invention improve the properties of quadratic residue sequences on improving array sound field by expanding the range of quadratic residue sequences and by means of the combination characteristics of multiple quadratic residue sequences.

(4). By using the method of the invention, the sound reinforcement system is applicable to sound field reproduction in the range of wideband and large space, and the quality of reproduced acoustic signals can be improved effectively, and the fluctuation of array sound pressure amplitude within the range of wideband is smaller than that of conventional methods, also, the interference effect of sound between multiple speaker units is smaller and sound signals can be reproduced more actually and naturally.

(5) According to the invention, phase delay control of multi-channel can be accomplished totally in digital signal processors such as DSP or FPGA, thus the hardware implementation is simple, and the device has high level of integration, smaller volume and weight.

(6) Multiple multi-unit speaker arrays according to the invention can be connected to each other, thereby forming sound array having larger scale and power to cover wider listening area in space.

(7) According to the invention, the location of index numbers can be determined according to experiential area coverage of the index number of minimum variance estimator, and thus avoiding the numerical calculation of modeling array sound field, and optimal phase delay vector can be obtained, thereby ensuring the improvement accuracy of uniform sound field while simplifying the process of designing delay vector.

wherein: 1, a sound source; 2, an optimal phase delay estimator; 3, an optimal phase delay controller; 4, a multi-channel power amplifier; 5, a speaker array.

DETAILED DESCRIPTION OF THE INVENTION

The present invention will be described hereinafter with reference to the appended drawings, it is to be noted, however, that the drawings illustrate only typical embodiments of this invention and are therefore not to be considered limiting of its scope, for the invention may admit to other equally effective embodiments.

Currently, the conventional methods for controlling sound field generally are based on array shape and array element intervals or based on multichannel amplitude and phase adjustment, which are complicated in physical implementation. Furthermore, for the conventional methods for controlling phase delay based on a quadratic residue sequence, the phase delay vector is designed only relying on single quadratic residue sequence with finite length, thus, these methods may have a limited ability to improve uniformity of sound field, and thus the benefit properties of quadratic residue sequences on improving uniformity of sound field are not utilized sufficiently. Considering the problems such as complexity and poor improvement on uniformity of sound field in the conventional methods, the invention provides a method and device for controlling speaker array sound field based on quadratic residue sequence combinations, wherein, by expanding the range of quadratic residue sequences, an optimal phase delay control vector is designed by means of combination characteristics of multiunit different quadratic residue subsequences, and array phase control is performed using such optimal phase delay vector to improve the uniformity of array sound field, Additionally, the method is simple in physical implementation, and thus sound reinforcement system provided therefrom is applicable within the range of wideband and large space.

Figure 1:
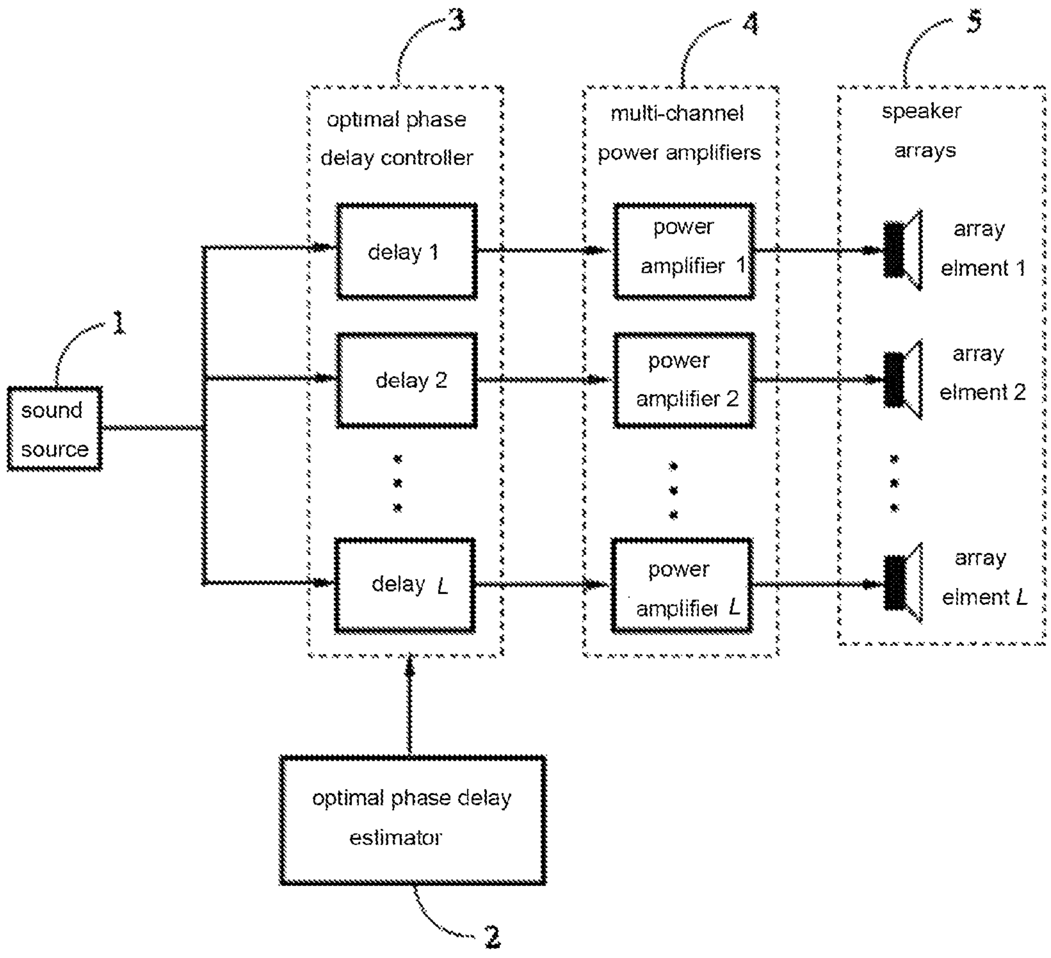
FIG. 1 is a block diagram illustrating the component modules of a control device of speaker array sound field based on quadratic residue sequence combinations according to the invention.

FIG. 1 shows a device for controlling speaker array sound field based on quadratic residue sequence combinations according to the invention, the body of which comprises a sound source 1, an optimal phase delay estimator 2, an optimal phase delay controller 3, a multi-channel power amplifier 4 and a speaker array 5.

Wherein the sound source 1 may be a sound source file in analog or digital format, or broadcast signals sent from a wireless transmitter, or the like.

Figure 2:
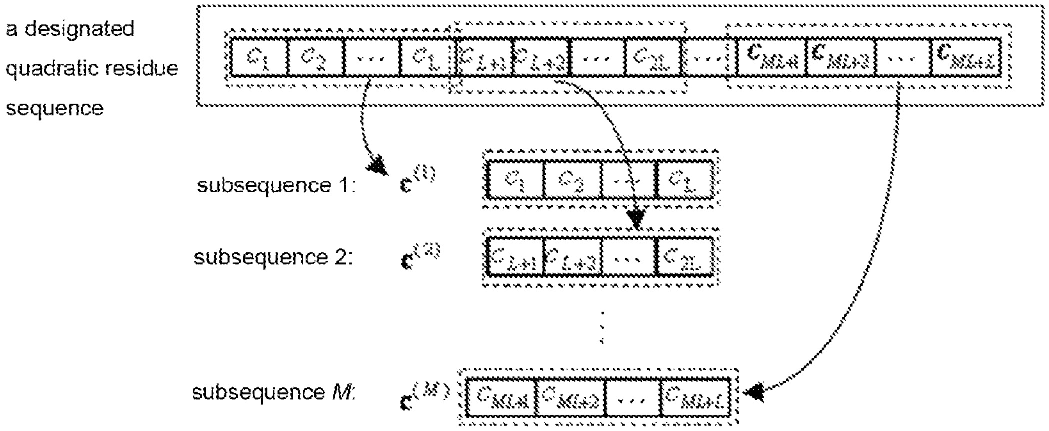
FIG. 2 is a schematic view showing the process of fragmenting a designated quadratic residue sequence into subsequences according to the invention.
Figure 3:
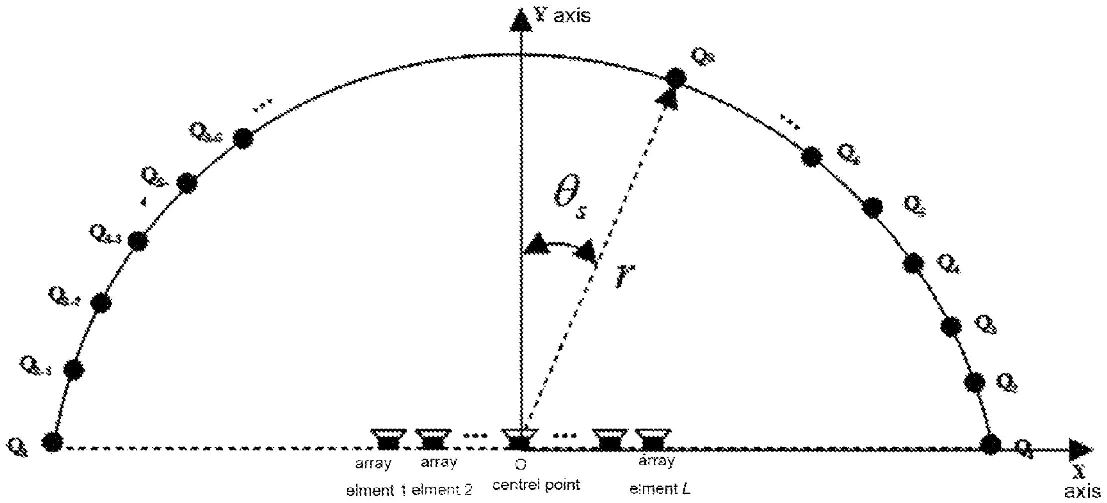
FIG. 3 is a schematic view showing the locations of the array and observation area according to the invention.
Figure 4:
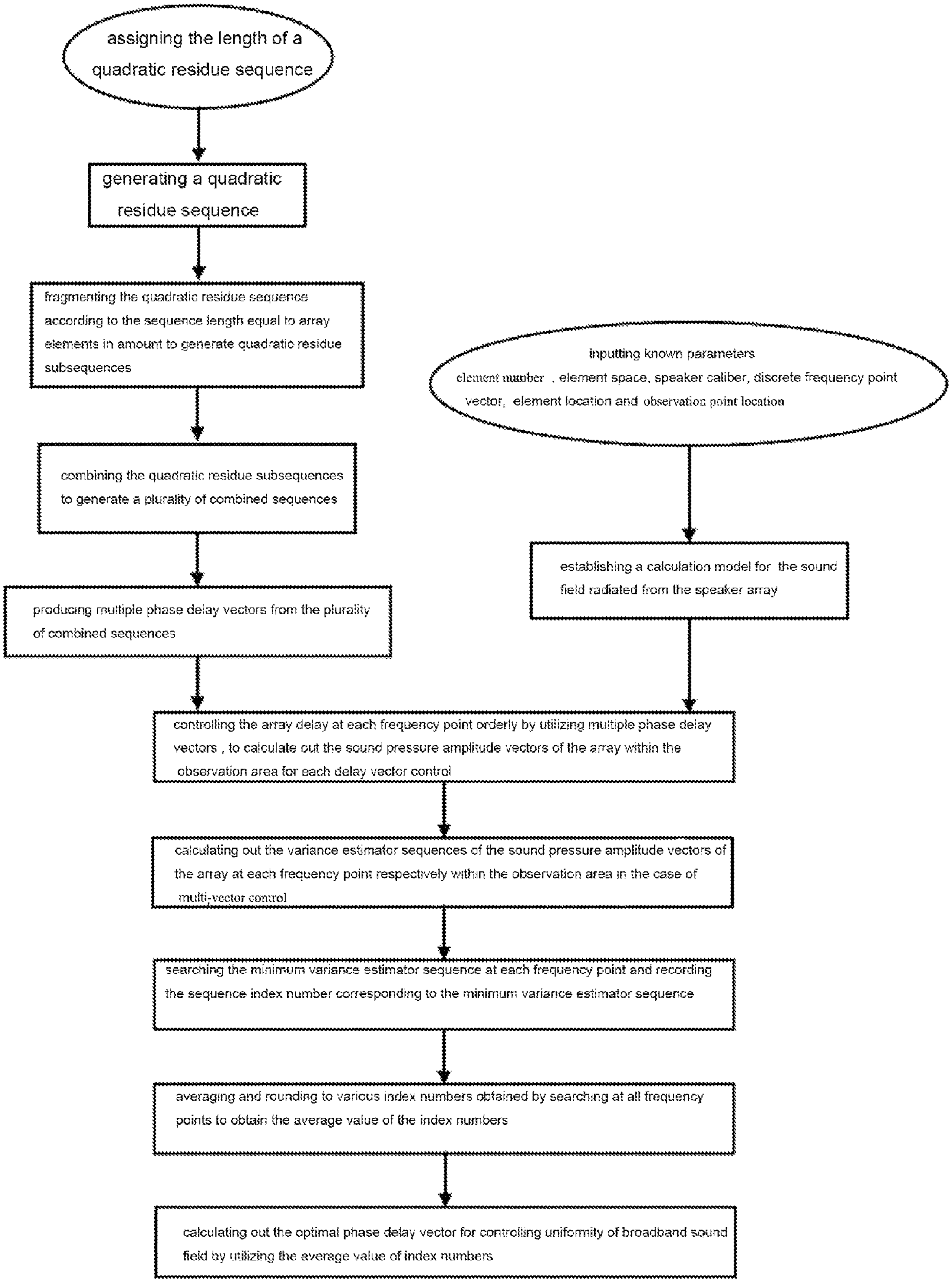
FIG. 4 is a flow chart showing signal processing of the optimal phase delay estimator according to the invention.

The optimal phase delay estimator 2 is electrically coupled to the input end of the optimal phase delay controller 3. Provided that the length of a quadratic residue sequence N is equal to 20001, and the number of array elements is 7, the quadratic residue sequence is blocked in terms of a sequence length equal to the number of array elements, as shown in FIG. 2, to generate 2857 quadratic residue subsequences $c_7^{(1)}, c_7^{(2)}, \ldots, c_7^{(2857)}$, and these subsequences are combined progressively to generate 2857 combined sequences $d_7^{\{1\}}$, $d_7^{\{1,2\}}, \ldots, d_7^{\{1,2,\ldots,2857\}}$, the phase delay vectors constructed from these combined sequences are $\phi_7^{\{1\}}$, $\phi_7^{\{1,2\}}, \ldots, \phi_7^{\{1,2,\ldots,2857\}}$. Provided that the observation space for the array is a circular area with a radius of 3 m and a observation angel from 0° to 360, then the circular observation area is sampled discretely in terms of an interval angel of 1°.

The optimal phase delay controller 3 is electrically coupled to the output end of the optimal phase delay estimator 2, which control the transmission signals of the 7-element channels to adjust phase in terms of the designated delay vector, according to the phase delay vector output from the optimal phase delay estimator.

The multi-channel power amplifier 4 is electrically coupled to the output end of the optimal phase delay controller 3, which is used for amplifying power of the multi-channel signals after phase delay adjustment to drive the speaker array sound.

The speaker array 5 is electrically coupled to the output end of multi-channel power amplifier 4. Provided that the speaker array is a 7-element linear array, the caliber of each array element is 6 cm, and the space between adjacent array elements is 7 cm, the propagation velocity of acoustic waves in air is 344 m/s, the working frequency of the array is from 100 Hz to 20 KHz.

Example 1

In this embodiment, provided that the frequency of sound source signals is 5 KHz, a radiation model of array sound field is established according to the input parameters of the speaker array, such as number of array elements, the space between adjacent elements, caliber of speaker, locations of elements as well as locations of observation points, then a designated quadratic residue sequence is blocked into subsequences which are combined orderly to generate combined sequences, and the phase delay vectors are designed as $\phi_7^{\{1\}}$, $\phi_7^{\{1,2\}}, \ldots, \phi_7^{\{1,2,\ldots,2857\}}$ respectively by utilizing the combined sequences, these phase delay vectors are used to control the speaker array respectively to generate sound pressure amplitude vectors $\hat{p}_{f_w,1}, \hat{p}_{f_w,2}, \ldots, \hat{p}_{f_w,2857}$, the variance sequences of these sound pressure amplitude vector sequences are calculated as $\mathrm{var}(\hat{p}_{f_w,1})$, $\mathrm{var}(\hat{p}_{f_w,2}), \ldots,$ $\mathrm{var}(\hat{p}_{f_w,2857})$, finally, by analyzing and comparing, the sequence index number corresponding to the minimum variance element of the variance sequences is selected, then the phase delay vector corresponding to such a index number is the optimal phase delay vector in this frequency.

Figure 5:
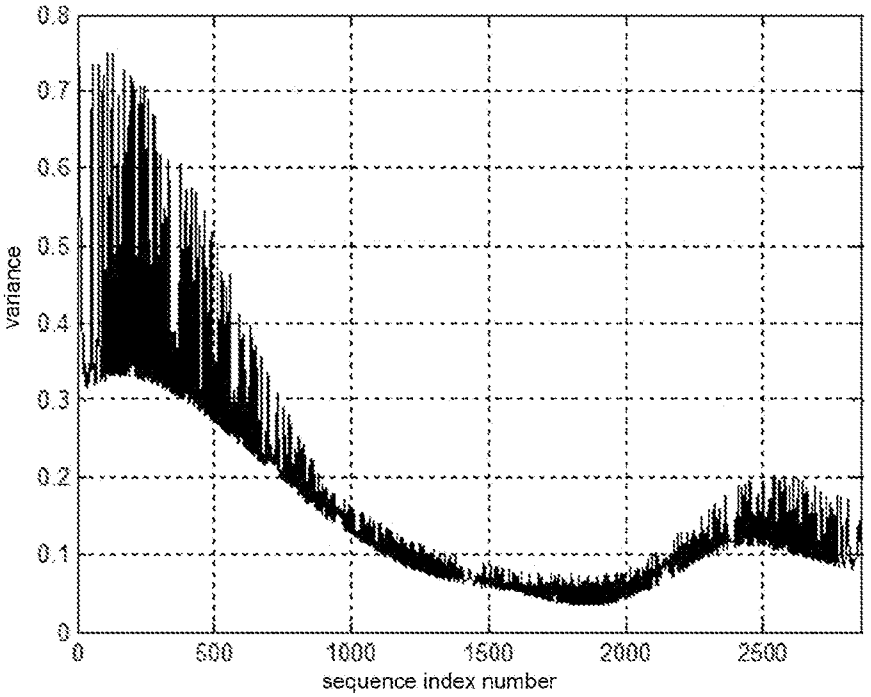
FIG. 5 is a graph showing the variation of numerical value of variance sequence with the sequence index number according to embodiment 1 of the invention, wherein the frequency of sound source is 5 KHz.

The curve showing numerical value variations of variance sequence with the index number of the sequence is illustrated in FIG. 5, wherein the frequency of the sound source is 5 KHz. As can be seen from the FIG. 5, when the array delay is controlled orderly by each of the phase delay vectors which are designed by combined sequences, the change curve showing the variance variations of each sound pressure amplitude vector with index numbers of combined sequences for the array within the observation area has only one valley point region. This shows that the optimal phase delay vector can be determined according to the method of the invention, and the index number of the optimal phase delay vector corresponds to that of the valley point location of the change curve. Thus, by searching for the valley point location of the curve, namely, searching for the index number corresponding to the minimum variance sequence, the phase delay vector corresponding to such index number can be identified as the optimal phase delay vector.

Figure 6:
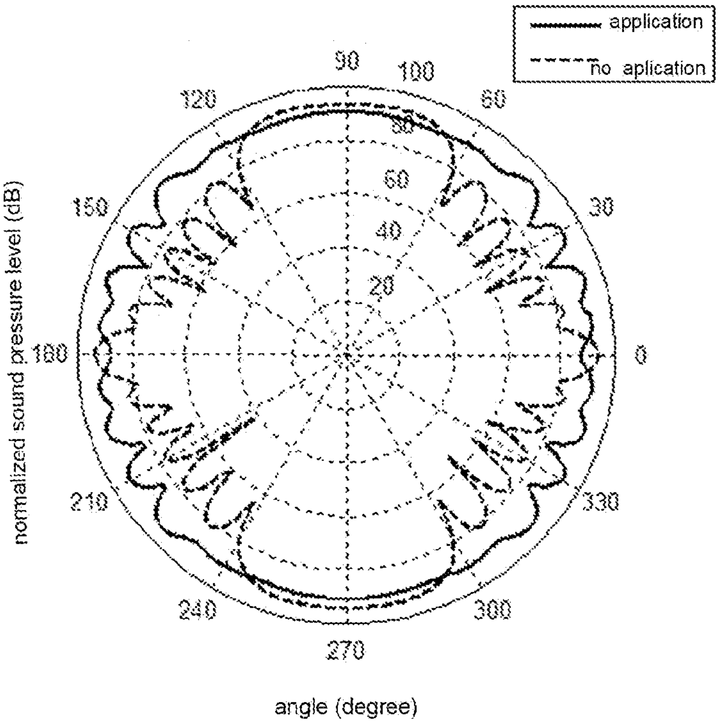
FIG. 6 is a comparative graph showing the sound pressure amplitude of the array within the observation area according to embodiment 1 of the invention, wherein phase delay vectors are applied and not applied to the array respectively.

According to the above method of searching minimum variance sequence, when the frequency of the sound source is 5 KHz, the sequence index number corresponding to the minimum variance is 1874, and the minimum variance corresponding to the location of the index number is 0.0354, and the optimal phase delay vector corresponding to the index number is $\phi_7^{\{1,2,\ldots,2857\}}$. FIG. 6 is a comparative graph showing the sound pressure amplitude of the array within observation area, wherein the phase delay vector is applied or not applied to the array. For the two curves in the FIG. 6, the sound pressure amplitude vectors are normalized according to the peak values of respective sound pressure, and the normalized sound pressure is converted to normalized sound pressure level. It can be seen from the two curves that, after applying the optimal phase delay vector, the sound field radiated from the array becomes more uniform, the number and amplitude fluctuation of peak-valley points are reduced respectively, and this shows that the phase delay design method of the invention can improve the sound field effectively. In both cases, the variance of sound pressure amplitude vector is calculated as 0.0345 and 0.07456 respectively, thus, the uniformity degree of sound field distribution is improved greatly in space when the optimal phase delay control is applied to the array.

Example 2

In this embodiment, provided that the frequency of the sound source signals varies from 100 Hz to 20 KHz pointwisely in terms of a frequency interval of 100 Hz, in the case of singe frequency input, the uniformity of sound field distribution of the array in three cases is compared and analyzed as follows:

In case 1, the phase delay control is not applied to the array, in the case of single frequency input, the sound pressure distribution characteristics of the array within the desired area are observed.

In case 2, array delay control is performed by utilizing the phase delay vector designed based on single quadratic residue sequence described in document 6, in the case of single frequency input, the sound pressure distribution characteristics of the array within desired radiation area are observed. In this case, the quadratic residue sequence is $c_7=[0\ 1\ 4\ 2\ 2\ 4\ 1]^T$ and the phase delay vector designed according to such sequence is $$\varphi_7 = c_7 \times \frac{2\pi}{7},$$

and array delay control is achieved by means of the phase delay vector, and then the effect of the delay control on improving the sound field radiated from the array is observed.

In case 3, by utilizing the method for designing phase delay vector based on the combination characteristics of quadratic residue sequences disclosed in the invention, at each frequency point, each of the phase delay vectors $\phi_7^{\{1\}}$, $\phi_7^{\{1,2\}}$, . . . , $\phi_7^{\{1,2, \ldots ,2857\}}$ is designed orderly according to each of the combined sequences $d_7^{\{1\}}$, $d_7^{\{1,2\}}$, . . . , $d_7^{\{1,2, \ldots ,2857\}}$ respectively, and the variance sequences var $(\hat{p}_{f_w,1})$, var$(\hat{p}_{f_w,2})$, . . . , var$(\hat{p}_{f_w,2857})$ of sound pressure amplitude radiated within desired area are calculated for the array in the case of respective phase delay vector control, to select the sequence index number $K_{opt}^{(f_w)}$ corresponding to the minimum variance, and then the optimal phase delay vector $$\varphi_{L,f_w}^{\{1,2,\ldots,K_{opt}^{(fw)}\}}$$

is selected in terms of this index number, finally, such optimal phase delay vector is used for delay control of the array, and the improvement effect of the sound field radiated from the array at each frequency point is observed.

Figure 7:
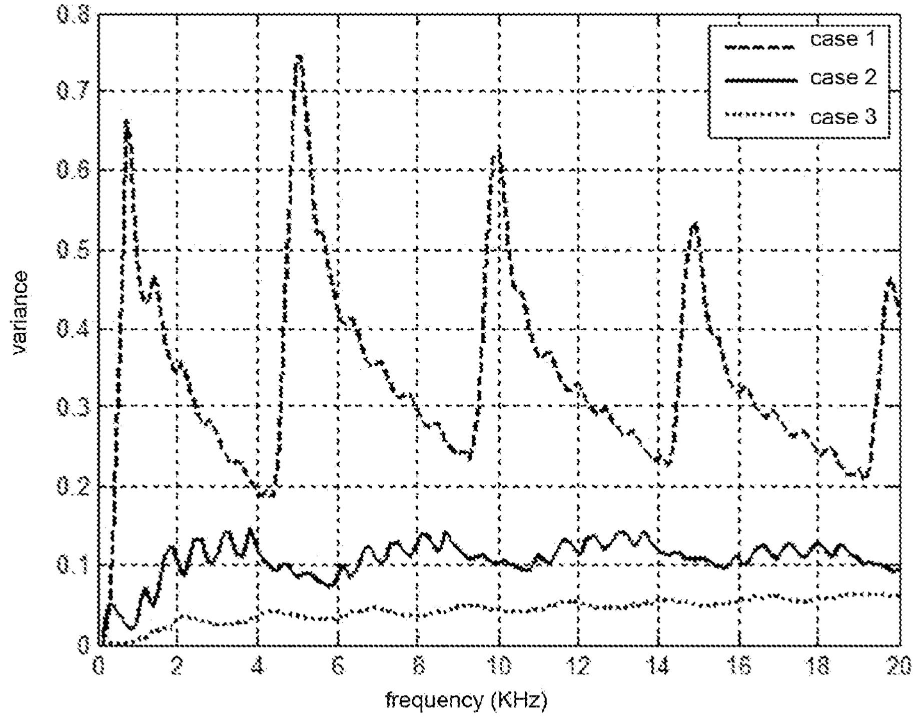
FIG. 7 is a comparative graph showing the variance variations of sound pressure amplitude vector of the array with the frequency in the three cases of embodiment 2 according to the invention.

FIG. 7 is a comparative graph showing variance variations with frequency for sound pressure amplitude vector of the array in the above three cases. As can be seen from the FIG. 7, in the case 1, the phase delay adjustment is not applied to the array, and the variance of amplitude vector of sound pressure radiated from the array is greater than 0.2. In the case 2, the array control is performed by utilizing the phase delay vector which is designed based on single quadratic residue sequence, and the variance of amplitude vector of sound pressure radiated from the array is substantially greater than 0.1. While in the case 3, the array control is performed by utilizing the optimal phase delay vector which is designed based on the combination characteristics of quadratic residue sequences, the variance of amplitude vector of sound pressure radiated from the array is substantially close to 0.05. Therefore, when the array delay is controlled by the design method of optimal phase delay vector provided in the invention, the resulting amplitude vector of sound pressure has minimum variance; the phase delay has best effect on improving uniformity of sound field radiated from the array. By comparing the variance curves at each frequency point of the method in document 6 to that of the invention, it is clear that the method of the invention is superior to that of document 6 in terms of improving uniformity of sound field.

Figure 8:
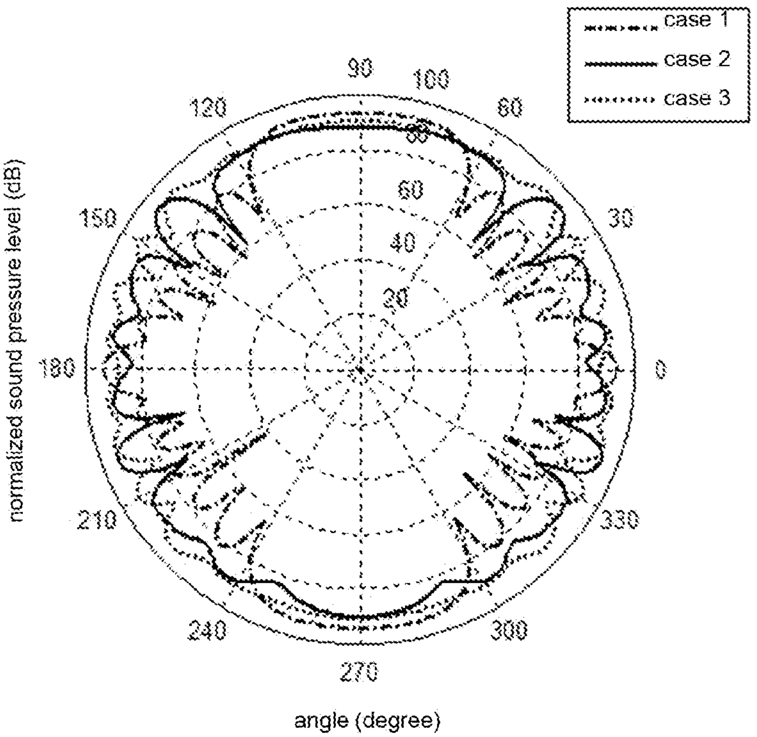
FIG. 8 is a graph showing the sound pressure amplitude distribution of the array in three cases according to embodiment 2 of the invention, wherein the frequency is 5 KHz.

FIG. 8 is a graph showing the amplitude distribution of sound pressure for the array in the three cases, wherein the frequency is 5 KHz. For all the three curves in the FIG. 8, the amplitude vectors of sound pressure are normalized according to the peak values of respective sound pressure, and the normalized sound pressure is converted to normalized sound pressure level. It can be seen from the three curves that, in the case of single frequency point, the method of the invention has best effect on improving sound field of the array and can achieve the best uniformity of sound field.

Example 3

In this embodiment, provided that the frequency of the sound source signals varies from 100 Hz to 20 KHz pointwisely in terms of a frequency interval of 100 Hz, in the case of wideband input of 100 Hz to 20 KHz, the uniformity of sound field distribution of the array in three cases is compared and analyzed as follows:

In case 1, the phase delay control is not applied to the array, in the case of wideband input of 100 Hz to 20 KHz, the distribution characteristics of sound pressure of the array within the desired area are observed.

In case 2, delay control is performed to the array utilizing the phase delay vector designed based on single quadratic residue sequence mentioned in document 6, in the case of wideband input of 100 Hz to 20 KHz, the distribution characteristics of sound pressure of the array within desired radiation area are observed. In this case, the single quadratic residue sequence is $c_7=[0\ 1\ 4\ 2\ 2\ 4\ 1]^T$ and the phase delay vector designed according to such sequence is $$\varphi_7 = c_7 \times \frac{2\pi}{7},$$

and array delay control is achieved by means of the phase delay vector, and then the effect of the delay control on improving the sound field radiated from the array is observed.

In case 3, by utilizing the method for designing phase delay vector based on the combination characteristics of quadratic residue sequences provided in the invention, at each frequency point, each of the phase delay vectors $\phi_7^{\{1\}}$, $\phi_7^{\{1,2\}}$, . . . , $\phi_7^{\{1,2, \ldots ,2857\}}$ is designed orderly according to each of the combined sequences $d_7^{\{1\}}$, $d_7^{\{1,2\}}$, . . . , $d_7^{\{1,2, \ldots ,2857\}}$ respectively, and the variance sequences var $(\hat{p}_{f_w,1})$, var$(\hat{p}_{f_w,2})$, . . . , var$(\hat{p}_{f_w,2857})$ of sound pressure amplitude radiated within desired area are calculated for the array in the case of respective phase delay vector control, to select the sequence index number $K_{opt}^{(f_w)}$ corresponding to the minimum variance, then the index numbers of sequences searched at all the frequency points are arranged as a column vector $K_{opt}^{(f)}=[K_{opt}^{(f_1)}\ K_{opt}^{(f_2)} \ldots K_{opt}^{(f_w)}]^T$, the average value of the column vector is calculated and rounded to obtain the averaged index number of sequences as $\overline{K_{opt}^{(f)}}=1902$, and then the optimal phase delay vector $\phi_{L,f}^{\{1,2, \ldots ,1902\}}$ in the case of wideband signals input is selected out by utilizing this averaged index number, finally, such optimal phase delay vector is used for delay control of the array, and the improvement effect of the sound field radiated from the array is observed in the case of wideband input of 100 Hz to 20 KHz.

Figure 9:
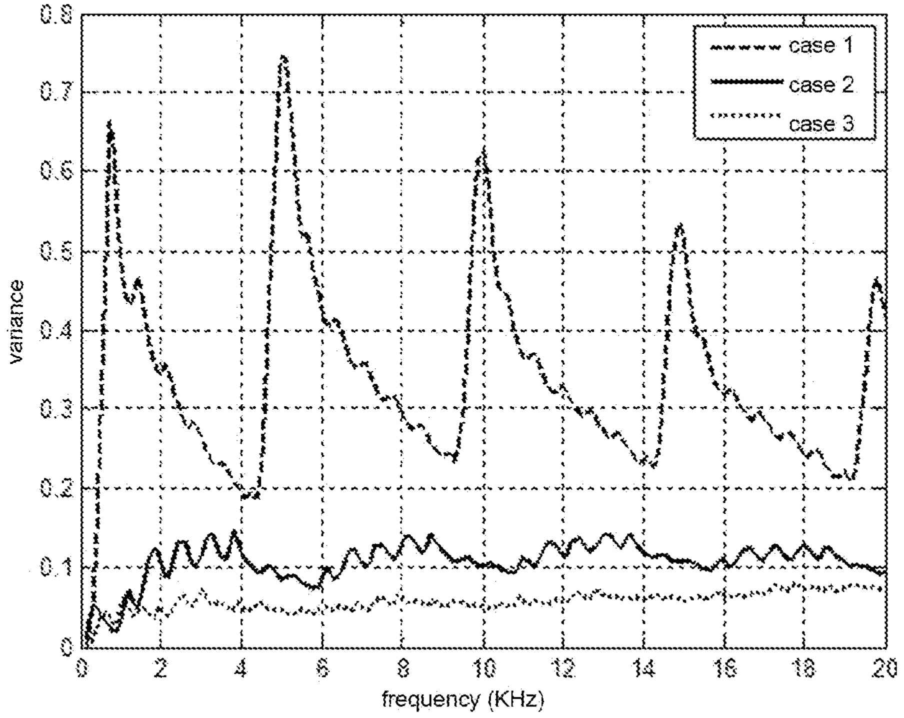
FIG. 9 is a comparative graph showing the variance variations of sound pressure amplitude vectors of the wideband array with the frequency in the three cases of embodiment 3 according to the invention.

FIG. 9 is a comparative graph showing variance variation with frequency for sound pressure amplitude vector of the array in the case of wideband input. As can be seen from the FIG. 9, in the case 1, the phase delay adjustment is not applied to the array, and the variance of amplitude vector of sound pressure radiated from the array is greater than 0.2. In the case 2, the array control is performed by utilizing the phase delay vector which is designed based on single quadratic residue sequence, and the variance of amplitude vector of sound pressure radiated from the array is substantially greater than 0.1. While in the case 3, the array control is performed by utilizing the optimal phase delay vector which is designed based on the combination characteristics of quadratic residue sequences, the variance of amplitude vector of sound pressure radiated from the array still remains close to 0.05 in the case of wideband input. Therefore, when the array delay is controlled by the design method of optimal phase delay vector provided in the invention, in the case of wideband input, the resulting amplitude vector of sound pressure still has minimum variance; the phase delay has best effect on improving uniformity of sound field radiated from the array. By comparing the variance curves at each frequency point of the method in document 6 to that of the invention, it is clear that the method of the invention is superior to that of document 6 in terms of improving uniformity of sound field.

Figure 10:
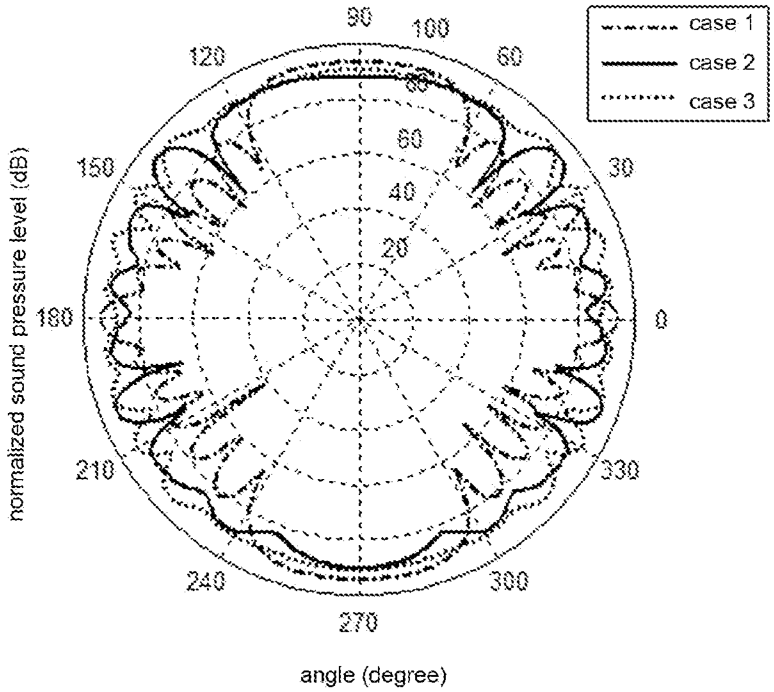
FIG. 10 is a graph showing the sound pressure amplitude distribution of the wideband array in three cases of embodiment 3 according to the invention, wherein the frequency is 5 KHz.

FIG. 10 is a graph showing the amplitude distribution of sound pressure for the array in the three cases, wherein the frequency is 5 KHz. For all the three curves in the FIG. 10, the amplitude vectors of sound pressure are normalized according to the peak values of respective sound pressure, and the normalized sound pressure is converted to normalized sound pressure level. It can be seen from the three curves that, in the case of wideband input, the method of the invention has best effect on improving sound field of the array and can achieve the best uniformity of sound field.

Figure 11:
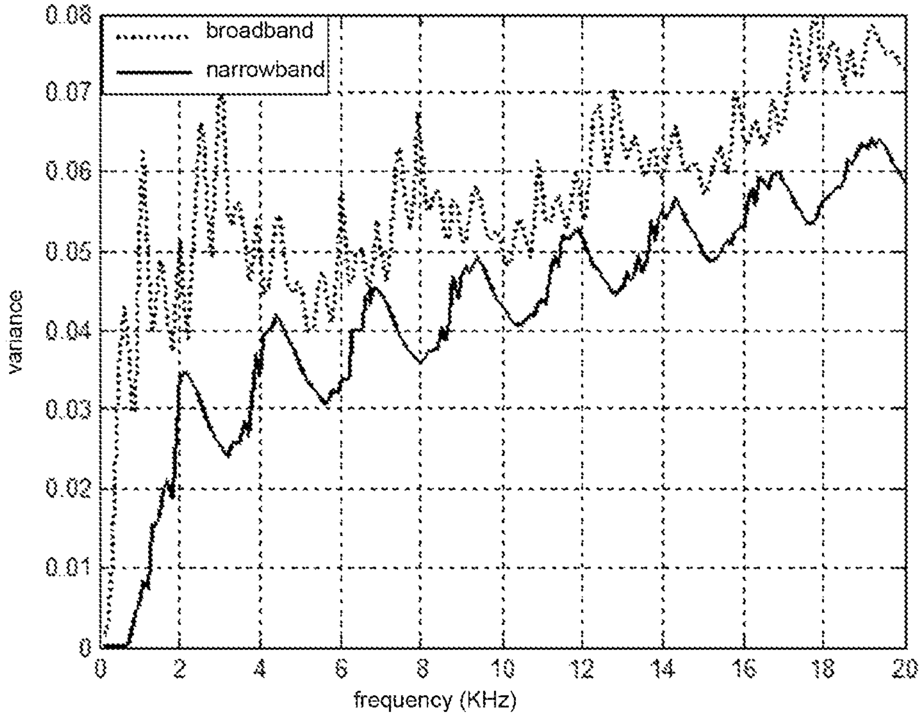
FIG. 11 is a comparative graph showing the improvement effect of sound field spatially radiated from the array according to the embodiments 2 and 3 of the invention, wherein the array control is carried out utilizing the optimal phase vector designed in terms of single frequency point and utilizing the optimal phase vector designed by performing average at all the frequency points respectively.

In the case of wideband input, the sequence index number corresponding to the optimal phase vector according to the invention is obtained by averaging and rounding the sequence index numbers selected at each frequency point, the course of averaging and rounding is to ensure the designed optimal phase delay vector can achieve better effect on improving uniformity of sound pressure at each of frequency points, but this is at the price of losing improvement of sound field at each frequency point. FIG. 11 is a comparative graph showing the improve effect of sound field radiated from the array, wherein the two curves illustrate that the array control is performed by the optimal phase delay vector designed based on single frequency point and designed by performing average process at all frequency points respectively. By comparing the two curves, it can be seen that, in the case of wideband input, the sequence index numbers of the optimal phase vectors designed at all the frequency points are averaged and rounded to obtain the index number of the optimal phase vector of the array, the course of averaging will decrease the improve effect of sound pressure at each frequency point, and thus the uniformity degree of sound pressure for the array in the whole space is decreased, but the optimal phase delay vector obtained from average processing can ensure better improve effect is achieved at each frequency point within the wideband range.

It should be stated that the above embodiments are simply intended to illustrate the technical scheme of the invention, instead of limitation. Although the invention is described in detail with reference to the embodiment, it should be appreciated by those skilled in the art that any variations or equal replacements of the technical scheme of the invention are covered within the scope of the invention, without departing from the spirit and scope of the invention.

What is claimed is:

1. A method for controlling speaker array sound field based on quadratic residue sequence combinations, comprising the steps of:

(1) fragmenting a designated quadratic residue sequence in terms of number of array elements, to generate a plurality of quadratic residue subsequences;

(2) designing an optimal array phase delay vector by using the subsequences;

(3) controlling transmission signals of multi-array-element channels by means of the optimal phase delay vector to adjust phase delay; and (4) transmitting the multi-channel signals subjected to delay adjustment to multi-channel power amplifiers, to drive a speaker array to generate a more uniform sound field.

2. The method for controlling speaker array sound field of claim 1, wherein the designated quadratic residue sequence in step (1) is produced from the following formula:

$$c_N = n^2 \bmod N$$

wherein:

$c_N$ is the No. n element of the designated quadratic residue sequence,

N is the length of the sequence, and mod represents modulo.

3. The method for controlling speaker array sound field of claim 1, wherein:

a sequence length N of the designated quadratic residue sequence in step (1) is greater than array element numbers L, and a minimum sequence length $N_{min}$ is greater than 10×L.

4. The method for controlling speaker array sound field of claim 1, wherein the step (1) is achieved by the following process:

provided that the designated quadratic residue sequence is expressed as:

$$c_N = [c_1 c_2 \ldots c_N]^T$$

fragmenting the quadratic residue sequence $C_N$ in terms of an element number L to generate M subsequences, wherein the sequence length N is greater than M×L, and upon fragmenting, the sequence $C_N$ being expressed by the quadratic residue subsequences as:

$$c_N = [C_L^{(1)T} c_L^{(2)T} \ldots c_L^{(M)T}]^T,$$

wherein $c_L^{(i)}$ is the No. i quadratic residue subsequence produced after sequence fragmentation, and $c_L^{(i)}$ being expressed as:

$$c_L^{(i)} = [c_{(i-1)L+1}^{(i)} c_{(i-1)L+2}^{(2)} \ldots c_{(i-1)L+L}^{(i)}]^T.$$

5. The method for controlling speaker array sound field of claim 4, wherein the step (2) is achieved by the following process:

constructing a phase delay control vector $\Phi_L^{(i)}$ for an array with L array elements from No. i quadratic residue subsequence $c_L^{(i)}$ with a length of L, and $\Phi_L^{(i)}$ being expressed as:

$$\varphi_L^{(i)} = [\phi_1^{(i)}\ \phi_2^{(i)}\ \dots\ \phi_L^{(i)}]^T = c_L^{(i)} \times \phi_0$$

wherein $\phi_l^{(i)}$ is the phase delay vector corresponding to the No. l array element, and $\phi_l^{(i)}$ being expressed as:

$$\phi_l^{(i)} = c_{(i-1)L+1}^{(i)} \times \phi_0$$

wherein $\phi_0$ is a phase delay constant, and $\phi_0$ being expressed as:

$$\phi_0 = 2\pi/N$$

combining the array phase delay vectors constructed from a plurality of quadratic residue subsequences, provided that a combination sequence of the quadratic residue sequences combined from $c_L^{(1)}, c_L^{(2)}, \dots c_L^{(K)}$, in terms of sequence number i of quadratic residue subsequences is $d_L^{\{1,2, \dots ,K\}}$, then expression formula thereof is:

$$d_L^{\{1,2, \dots ,K\}} = [c_L^{(1)}, c_L^{(2)}, \dots c_L^{(K)},]$$

wherein $1 \le K \le M$, and the array phase delay vector constructed from the combination sequence $d_L^{\{1,2, \dots ,L\}}$ of the quadratic residue subsequences is $\Phi_L^{\{1,2, \dots ,K\}}$, being expressed as:

$$\begin{aligned} \varphi_L^{\{1,2,\dots,K\}} &= \underbrace{\varphi_L^{(1)} \times \varphi_L^{(2)} \times \dots \times \varphi_L^{(K)}}_{\text{multiplication of } k \text{ vectors}} \\ &= \underbrace{c_L^{(1)} \times \phi_0 \times c_L^{(2)} \times \phi_0 \times \dots \times c_L^{(K)} \times \phi_0}_{\text{mutiplication of } k \text{ vectors}} \\ &= \underbrace{c_L^{(1)} \times c_L^{(2)} \times \dots \times c_L^{(K)}}_{\text{multiplication of } k \text{ vectors}} \times (\phi_0)^K \\ &= \underbrace{c_L^{(1)} \times c_L^{(2)} \times \dots \times c_L^{(K)}}_{\text{multiplication of } k \text{ vectors}} \times \phi_0^K \end{aligned}$$

$$\text{wherein } \phi_0^K = \frac{2\pi K}{N};$$

provided that in free space, the sound field radiated from a L-element speaker array is sampled discretely at S points in a semi-circular space with a radius of r, in a case where the center position of the speaker array is defined as coordinate origin O, an included angle between the line connecting No. s observation point with the coordinate origin O and an array normal line is defined as Qs, then a coordinate Qs of the No. s observation point is expressed as:

$$q_s = (x_s, y_s)$$

and a position coordinate of the No. l array element being expressed as:

$$u_l = (x_l, y_l)$$

provided that a distance between the No. l array element and the No. s observation point is $r_l^{(s)}$, then an expression formula thereof is:

$$r_l^{(s)} = \|q_s - u_l\| = \sqrt{(x_s - x_l)^2 + (y_s - y_l)^2}$$

and in a case where the frequency of sound source signals is f, a sound pressure radiated from the No. l array element at the No. s observation point $Q_s$ may be expressed as:

$$p_{l,f}^{(s)} = A \frac{\exp j(2\pi ft - kr_l^{(s)})}{kr_l^{(s)}}$$

wherein:

A is an amplitude of the sound source signals, k=2πf/c and represents wave number, and c represents a spread velocity of sound wave, if the effect of the amplitude A and phase exp(j2πft) of the sound source signals is neglected, then the sound pressure radiated from the No. l array element at the No. s observation point $Q_s$ may be expressed as:

$$\tilde{p}_{l,f}^{(s)} = \frac{\exp(-jkr_l^{(s)})}{kr_l^{(s)}},$$

and the sound pressure radiated from the whole speaker array at the No. s observation point $Q_s$ being expressed as:

$$\tilde{p}_f^{(s)} = \sum_{l=1}^{L} \tilde{p}_{l,f}^{(s)} = \sum_{l=1}^{L} \frac{\exp(-jkr_l^{(s)})}{kr_l^{(s)}};$$

introducing the array phase delay vector $\Phi_L^{\{1,2, \dots ,K\}}$ constructed from the combination sequence $d_L^{\{1,2, \dots ,K\}}$ of the quadratic residue sequence into the speaker array, and controlling phase delay of each array element according to the vector $\Phi_L^{\{1,2, \dots ,K\}}$ and then the sound pressure radiated from the whole array after phase delay at the No. s observation point $Q_s$ being expressed as:

$$\tilde{p}_{f,K}^{(s)} = \sum_{l=1}^{L} \tilde{p}_{l,f}^{(s)} = \sum_{l=1}^{L} \frac{\exp(-jkr_l^{(s)})}{kr_l^{(s)}} \times \exp(j\varphi_L^{\{1,2,\dots,K\}});$$

arranging the sound pressure radiated from the speaker array at all observation points after phase delay adjustment as a column vector, which is expressed as:

$$\tilde{p}_{f,k} = [\tilde{p}_{f,k}^{(1)} \tilde{p}_{f,k}^{(2)} \dots \tilde{p}_{f,k}^{(s)}]^T$$

the sound pressure amplitude vectors corresponding to all observation points being expressed as:

$$\hat{p}_{f,k} = [|\tilde{p}_{f,k}^{(1)}||\tilde{p}_{f,k}^{(2)}| \dots |\tilde{p}_{f,k}^{(s)}|]^T$$

and the variance estimators of the sound pressure amplitude vectors at all observation points for the speaker array being expressed as:

$$\text{var}(\hat{p}_{f,K}) = \frac{\sum_{s=1}^{S} [\hat{p}_{f,K} - \overline{\hat{p}_{f,K}}]^2}{S}$$

wherein $$\overline{\hat{p}_{f,K}} = \frac{\sum_{s=1}^{S} \hat{p}_{f,K}}{S}$$

represents an average value of the sound pressure amplitude vectors; and when phase delay vectors $\Phi_L^{\{1\}}$, $\Phi_L^{\{1,2\}}$, . . . , $\Phi_L^{\{1,2,\ldots,K\}}$, . . . , $\Phi_L^{\{1,2,\ldots,M\}}$ generated from combination sequences $d_L^{\{1\}}$, $d_L^{\{1,2\}}$, . . . , $d_L^{\{1,2,\ldots,K\}}$, . . . , $d_L^{\{1,2,\ldots,M\}}$ of the quadratic residue sequence are applied to the array respectively, in a case where each delay vector control is performed, the variance estimator sequences of sound pressure amplitude vectors at all observation points are calculated as $\mathrm{var}(\hat{p}_{f,1})$, $\mathrm{var}(\hat{p}_{f,2})$, . . . , $\mathrm{var}(\hat{p}_{f,K})$, . . . , $\mathrm{var}(\hat{p}_{f,M})$, and the above variance estimators being arranged as a column vector, which is expressed as:

$$\mathrm{var}(\hat{p}_f)=[\mathrm{var}(\hat{p}_{f,1})\mathrm{var}(\hat{p}_{f,2})\ldots\mathrm{var}(\hat{p}_{f,M})]^T;$$

by analyzing and comparing numerical values of various elements of variance estimator vectors, selecting the phase delay vector corresponding to a minimum variance estimator as an optimal phase delay vector, and adjusting phase delay for the array utilizing the optimal phase delay vector to obtain optimal array radiation sound field, provided that an index number of the minimum variance estimator in variance estimator vectors for the sound pressure amplitude vectors is $K_{opt}$, then the corresponding minimum variance estimator is expressed as:

$$\mathrm{var}(\hat{p}_{f,K_{opt}}) = \min(\mathrm{var}(\hat{p}_f)) = \frac{\sum_{s=1}^{S}\left[\hat{p}_{f,K_{opt}} - \overline{\hat{p}_{f,K_{opt}}}\right]^2}{S}$$

the optimal phase delay vector applied to the array corresponding to the minimum variance estimator being:

$$\varphi_L^{\{1,2,\ldots,Kopt\}} = \underbrace{\varphi_L^{(1)}\times\varphi_L^{(2)}\times\ldots\times\varphi_L^{(Kopt)}}_{multiplication\ of\ k\ vector} = \underbrace{c_L^{(1)}\times c_L^{(2)}\times\ldots\times c_L^{(Kopt)}}_{multiplication\ of\ k\ vector}\times\phi_0^{(Kopt)}$$

wherein $$\phi_0^{(Kopt)} = 2\pi K_{opt}/N;$$

when the optimal phase delay vector for the speaker array is designed in a case where sound source signals are input in broadband, the whole broadband is discretized in terms of a designated frequency interval to select sequence index numbers corresponding to the optimal array phase delay vectors at each discrete frequency point, and the sequence index numbers of these optimal vectors being arrayed as one index number vector, then an index number vector being averaged to obtain an average sequence index number, then the optimal phase delay vector corresponding to an average sequence index number being used as the optimal phase delay vector for the array in the case of broadband radiation, provided that the working frequency band of the speaker array is discretized to W frequency points, then a discretization frequency vector consisting of such discrete frequency point sequence is expressed as:

$$f=[f_1 f_2 \ldots f_W]^T,$$

at a No. w frequency sample point, when phase delay vectors $\Phi_L^{\{1\}}$, $\Phi_L^{\{1,2\}}$, . . . , $\Phi_L^{\{1,2,\ldots,K\}}$, . . . , $\Phi_L^{\{1,2,\ldots,M\}}$ generated from combination sequences $d_L^{\{1\}}$, $d_L^{\{1,2\}}$, . . . , $d_L^{\{1,2,\ldots,K\}}$, . . . , $d_L^{\{1,2,\ldots,M\}}$ of the quadratic residue sequence are applied to the speaker array respectively, in the case where each delay vector control is performed, the variance estimator sequences of sound pressure amplitude vectors at all observation points are calculated respectively as $$\mathrm{var}(\hat{p}_{f_w,1}),\mathrm{var}(\hat{p}_{f_w,2}),\ldots,\mathrm{var}(\hat{p}_{f_w,K}),\ldots,\mathrm{var}(\hat{p}_{f_w,M}),$$

then the above variance estimators being arranged as one column vector, which is expressed as:

$$\mathrm{var}(\hat{p}_{f_w})=[\mathrm{var}(\hat{p}_{f_w,1})\mathrm{var}(\hat{p}_{f_w,2})\ldots\mathrm{var}(\hat{p}_{f_w,M})]^T$$

by analyzing and comparing a numerical value of each element of variance estimator vector, selecting the index number of the minimum variance estimator in the variance estimator vectors as $K_{opt}^{(fw)}$ corresponding minimum variance estimator thereof being $$\mathrm{var}(\hat{p}_{f_w,K_{opt}^{(fw)}})$$

and the optimal phase delay vector applied to the array corresponding to such a minimum variance estimator being:

$$\varphi_{L,f_w}^{\{1,2,\ldots,K_{opt}^{(fw)}\}} = \underbrace{\varphi_L^{(1)}\times\varphi_L^{(2)}\times\ldots\times\varphi_L^{\left(K_{opt}^{(fw)}\right)}}_{multiplication\ of\ k\ vectors} = \underbrace{c_L^{(1)}\times c_L^{(2)}\times\ldots\times c_L^{\left(K_{opt}^{(fw)}\right)}}_{multiplication\ of\ k\ vectors}\times\phi_0^{K_{opt}^{(fw)}}$$

wherein $$\phi_0^{K_{opt}^{(fw)}} = 2\pi K_{opt}^{(fw)}/N,$$

according to such an analysis process, selecting the optimal phase delay vectors at each discrete frequency point and the corresponding sequence index numbers orderly, and the sequence index numbers of the optimal phase delay vectors obtained from all frequency points being arranged as one column vector, which is expressed as:

$$K_{opt}^{(f)}=[K_{opt}^{(f1)}K_{opt}^{(f2)}\ldots K_{opt}^{(fw)}]^T,$$

wherein an average value of such index number vector is expressed as:

$$\overline{K_{opt}^{(f)}} = \left[\frac{K_{opt}^{(f)}}{W}\right]$$

wherein an operator [X] represents the largest integer part less than or equal to [X], according to the average value of such index number, the corresponding optimal phase delay vector applied to a broadband array being selected as:

$$\varphi_{L,f}^{\{1,2,\ldots,\overline{K_{opt}^{(f)}}\}} = \underbrace{\varphi_L^{(1)}\times\varphi_L^{(2)}\times\ldots\times\varphi_L^{(\overline{K_{opt}^{(f)}})}}_{multiplication\ of\ k\ vectors} = \underbrace{c_L^{(1)}\times c_L^{(2)}\times\ldots\times c_L^{(\overline{K_{opt}^{(f)}})}}_{multiplication\ of\ k\ vectors}\times\phi_0^{K_{opt}^{(f)}}$$

-continued wherein $$\phi_0^{\overline{K_{opt}^{(f)}}} = 2\pi\overline{K_{opt}^{(f)}}/N,$$

by using the optimal phase delay vector $$\varphi_{L,f}^{\left\{1,2, \ldots ,\overline{K_{opt}^{(f)}}\right\}}$$

for the speaker array, the optimal sound field radiation characteristics of the array within the whole designated broadband range being obtained.

6. The method for controlling speaker array sound field of claim 1, wherein in the step (3), the phase delay adjustment for the multi-array-element channels is achieved by utilizing a digital phase delay method, according to the numerical value of the optimal phase delay vector within digital signal processors comprising DSP or FPGA.

7. A device for controlling speaker array sound field based on quadratic residue sequence combinations, comprising:

a sound source;

a phase delay estimator configured to calculate an optimal phase delay vector for a speaker array in order to achieve a more uniform sound field control within a range of large space and broadband;

a phase delay controller electrically coupled to output ends of the sound source and optimal phase delay estimator, respectively, configured to upload the optimal phase delay vector calculated by the optimal phase delay estimator onto each array element channel, and also configured to adjust phase retardation of each array element channel according to the optimal phase delay vector by:

(1) fragmenting a designated quadratic residue sequence in terms of a number of array element channels, to generate a plurality of quadratic residue subsequences;

(2) designating an optimal array phase delay vector by using the subsequences; and (3) controlling transmission signals of the array element channels by means of the optimal phase delay vector to adjust phase delay;

a multi-channel power amplifier electrically coupled to an output end of the phase delay controller, configured to receive multi-channel signals subjected to the delay adjustment and amplify power of the multi-channel signals to drive the speaker array; and wherein the speaker array is electrically coupled to an output end of the multi-channel power amplifier, for converting electrical power signals after phase delay adjustment into air vibration signals to improve uniformity of the sound field radiated from the speaker array.

8. The device for controlling speaker array sound field of claim 7, wherein the sound source is selected from analog sound source signals generated from various analog devices, digital coding signals generated from various digital devices, or specified sound source signals which are received and demodulated by wireless receivers from broadcast signals' sent from wireless transmitter, or any combination thereof.

9. The device for controlling speaker array sound field as claimed in claim 7, wherein the signal processing of the optimal phase delay estimator utilizes a method of array modeling comprising:

(A) inputting the length of a designated quadratic residue sequence to generate a quadratic residue sequence in terms of a sequence length, and fragmenting a designated quadratic residue sequence according to the sequence length equal to array elements in amount to generate quadratic residue subsequences, and then combing quadratic residue subsequences to generate a plurality of combined sequences, and generating corresponding multiple phase delay vectors from the plurality of combined sequences respectively; subsequently, inputting known parameters for sound field modeling, and establishing a calculation model for a spatial sound field radiated from the speaker array by utilizing the parameters;

(B) controlling the array delay at each frequency point orderly by utilizing multiple phase delay vectors respectively, to calculate sound pressure amplitude vectors of the array within an observation area for each delay vector control, and then calculating variance estimator sequences of the sound pressure amplitude vectors of the array at each frequency point orderly within the observation area in the case of multi-vector control; and (C) searching minimum variance estimator sequences at each frequency point and recording the sequence index number corresponding to the minimum variance estimator sequence, and then averaging the index numbers, and subsequently calculating an optimal phase delay vector for controlling uniformity of broadband sound field by utilizing the average value of the recorded index numbers.

10. The device for controlling speaker array sound field of claim 7, wherein the optimal phase delay estimator determines a location of index numbers according to an experiential area coverage of minimum variance sequences.

11. The device for controlling speaker array sound field of claim 7, wherein the optimal phase delay controller achieves the phase delay operation of multi-channel broadband signals of the array by designing an appropriate filter coefficient, according to linear phase characteristics of finite impulse response filters.

12. The device for controlling speaker array sound field of claim 7, wherein the multi-channel power amplifier is a multi-channel power amplifier of AB type or D type.

13. The device for controlling speaker array sound field of claim 7, wherein the sound field modeling parameters comprise array element number, array element space, speaker caliber, discrete frequency point vector, array element location, and observation point location.

* * * * *